(12) United States Patent
Larson et al.

(10) Patent No.: US 9,674,382 B2
(45) Date of Patent: Jun. 6, 2017

(54) PLATENS FOR IMAGING DEVICES

(75) Inventors: David B. Larson, Eagle, ID (US); D. Matthew Blue, Caldwell, ID (US); Dean J. Richtsmeier, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 925 days.

(21) Appl. No.: 13/532,318

(22) Filed: Jun. 25, 2012

(65) Prior Publication Data

US 2013/0342878 A1 Dec. 26, 2013

(51) Int. Cl.
*H04N 1/12* (2006.01)
*H04N 1/00* (2006.01)
*H04N 1/195* (2006.01)

(52) U.S. Cl.
CPC .......... *H04N 1/00551* (2013.01); *H04N 1/12* (2013.01); *H04N 1/19594* (2013.01); *H04N 2201/0081* (2013.01); *H04N 2201/0091* (2013.01); *H04N 2201/0094* (2013.01); *H04N 2201/0436* (2013.01)

(58) Field of Classification Search
CPC ......... H04N 1/04; H04N 1/38; H04N 1/00551
See application file for complete search history.

(56) References Cited

U.S. PATENT DOCUMENTS

| 4,607,291 | A | * | 8/1986 | Oono | G03B 21/132 347/218 |
|---|---|---|---|---|---|
| 4,811,110 | A | * | 3/1989 | Ohmura | H04N 1/00249 353/119 |
| 4,956,664 | A | * | 9/1990 | Hasegawa | G03B 21/132 355/43 |
| 5,680,204 | A | * | 10/1997 | Ferrara | H04N 1/1017 355/75 |
| 6,587,233 | B1 | * | 7/2003 | Salgado | 358/505 |
| 6,707,584 | B1 | * | 3/2004 | Morita | 358/498 |
| 7,107,004 | B2 | * | 9/2006 | Saito | G03G 15/6573 399/405 |
| 7,130,088 | B2 | | 10/2006 | Breslawski et al. | |
| 7,268,923 | B2 | * | 9/2007 | Schroath et al. | 358/474 |
| 7,446,790 | B2 | | 11/2008 | Takabatake | |
| D681,107 | S | * | 4/2013 | Larson | D14/420 |
| 2003/0020970 | A1 | * | 1/2003 | Haas et al. | 358/506 |
| 2005/0152715 | A1 | * | 7/2005 | Park | G03G 21/1666 399/110 |
| 2005/0219649 | A1 | * | 10/2005 | Kim | 358/486 |
| 2006/0203293 | A1 | * | 9/2006 | Yasue et al. | 358/296 |

(Continued)

FOREIGN PATENT DOCUMENTS

JP 2011056821 A 3/2011

OTHER PUBLICATIONS

Burroughs Payment Systems, "Burroughs EF375 Printer," www.Burroughs.com, 2010.

(Continued)

*Primary Examiner* — Ibrahim Siddo
(74) *Attorney, Agent, or Firm* — HP Inc. Patent Department

(57) ABSTRACT

Platens for imaging devices are disclosed. An example platen for an imaging device includes a body to be removably coupled to an upper surface of the imaging device. The body includes a first portion and a second portion opposite the first portion. An object whose image is to be captured is to be placed on the first portion.

28 Claims, 12 Drawing Sheets

(56) References Cited

U.S. PATENT DOCUMENTS

| | | | |
|---|---|---|---|
| 2007/0076268 A1* | 4/2007 | Shojo | H04N 1/00347 358/474 |
| 2007/0172276 A1* | 7/2007 | Wang et al. | 399/367 |
| 2010/0097667 A1* | 4/2010 | Ikeda | H04N 1/00535 358/497 |
| 2010/0214590 A1* | 8/2010 | Ray et al. | 358/1.14 |
| 2011/0182647 A1 | 7/2011 | Kawaguchi | |
| 2011/0193925 A1 | 8/2011 | Matsushima et al. | |
| 2011/0216178 A1* | 9/2011 | Carpenter | H04N 7/18 348/61 |
| 2011/0317225 A1* | 12/2011 | Caspar | H04N 1/00525 358/474 |
| 2013/0321830 A1* | 12/2013 | Jimenez | H04N 1/00535 358/1.13 |

OTHER PUBLICATIONS

Seiko Instruments GMBH, "LTPF247/LTPF327," SII: Seiko Instruments GmbH http://www.seiko-instruments.de/54-0-ltpf247347.html (Last Accessed on Sep. 25, 2012).

* cited by examiner

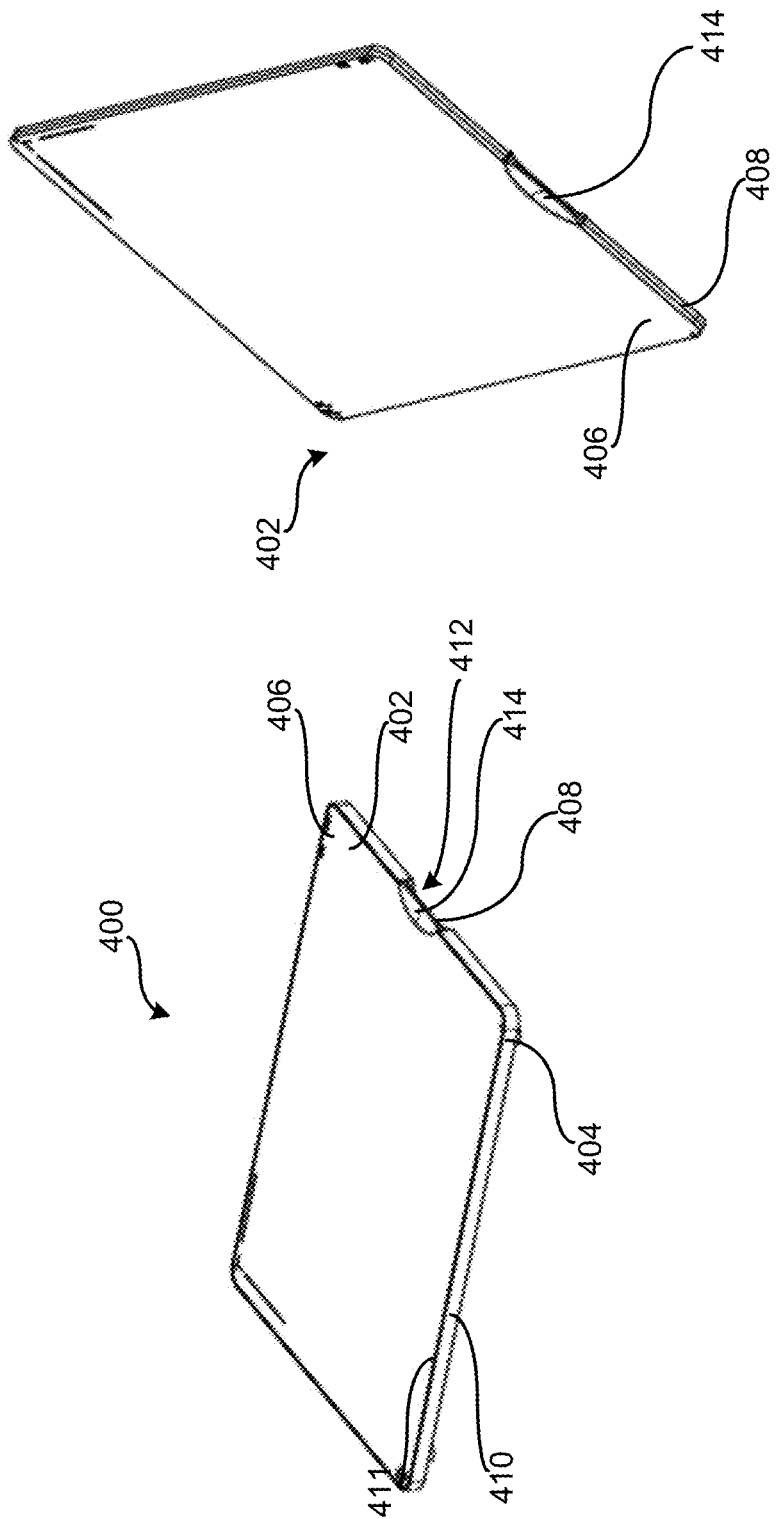

PLATENS FOR IMAGING DEVICES

BACKGROUND

Imaging devices may be used for a variety of purposes such as printing, scanning and/or copying documents and/or objects. In some known examples, a gap between an imaging device and a platen fixed thereto is relatively large to enable access to paper jams within the imaging device and/or consumables used by the imaging device.

BRIEF DESCRIPTION OF THE DRAWINGS

FIG. 4 depicts another example platen constructed in accordance with the teachings of this disclosure.

FIG. 5 is a top, perspective view of the example platen of FIG. 4.

Figure 1:
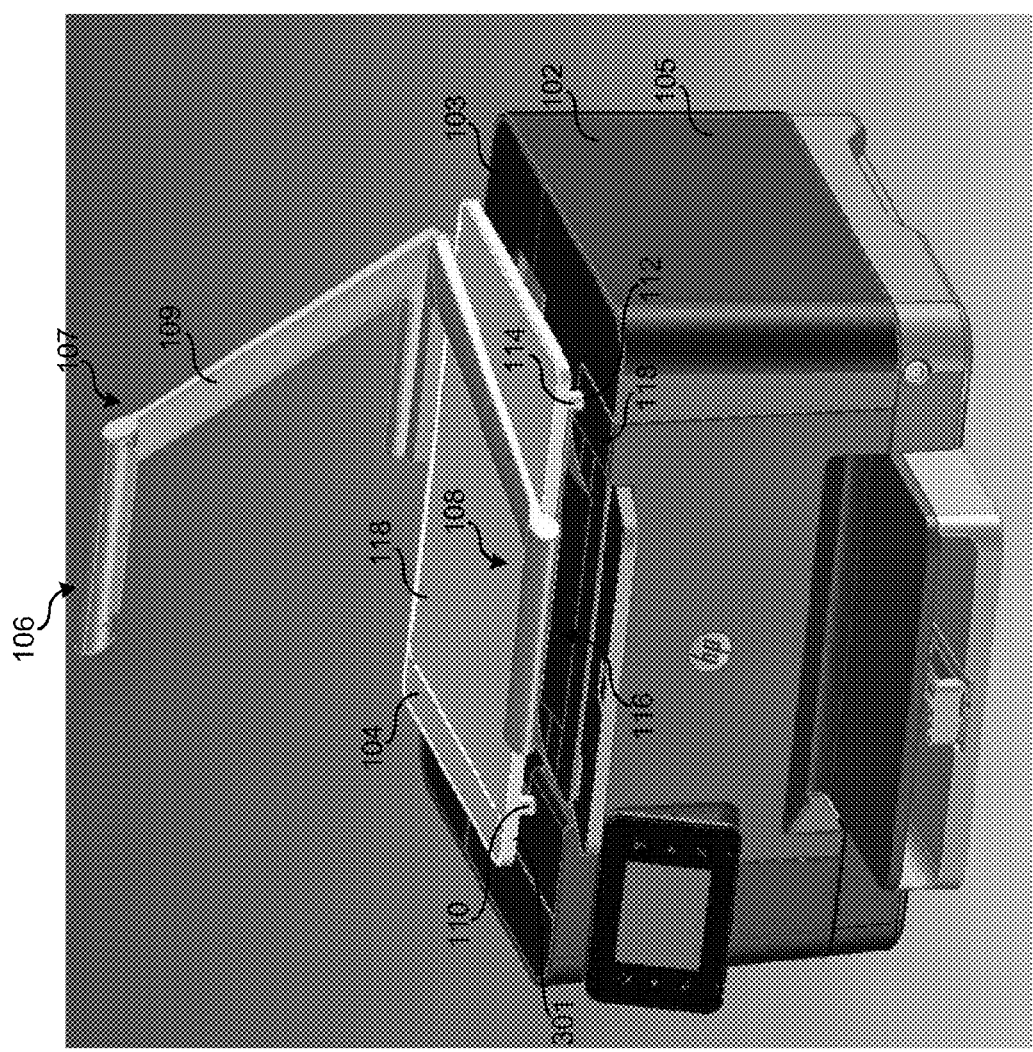
FIG. 1 depicts an example imaging device including an example platen constructed in accordance with the teachings of this disclosure.

Certain examples are shown in the above-identified figures and described in detail below. The figures are not necessarily to scale and certain features and certain views of the figures may be shown exaggerated in scale or in schematic for clarity and/or conciseness.

DETAILED DESCRIPTION

Example platens are disclosed which facilitate access to paper jams, consumables (e.g., ink cartridges), etc. associated with imaging devices. In some such examples, the example platen is removably and/or hingably coupled to an imaging device (e.g., a printer, a scanner, a facsimile machine, a multi-function device, etc.) and positioned between an upper surface of a housing of the imaging device and an image capture device (e.g., a camera) positioned above the housing for capturing image(s) of object(s) located on the platen. In some such examples, a first portion and/or surface of the platen faces the housing of the image capture device and a second portion and/or surface of the platen at least partially defines a paper output path of the imaging device.

In some examples disclosed herein, a first portion of the platen is relatively flat to produce a stable support surface for an object (e.g., a document, a three-dimensional object, etc.) whose image is to be captured. In some examples disclosed herein, the second portion of the platen includes a guide and/or ribs that partially define a paper output path when the platen is coupled to the imaging device. In some examples disclosed herein, to substantially prevent condensation from forming on the image capture device when the image capture device is in a non-use position, the second portion of the platen includes a lip and/or defines a receptacle that receives at least a portion of the image capture device when in the non-use position.

In some examples, to couple and/or align the platen relative to the imaging device, the second portion of the platen includes hinges (e.g., frictional hinges), locators, aligners, pegs, guides and/or ribs that interlock, couple to and/or matingly engage the housing of the imaging device. Using hinges and/or pegs to couple the platen to the imaging device enables the platen to be positioned relatively close to the imaging device and for the imaging device to have a relatively compact (e.g., low profile from a height perspective) form factor. In some examples disclosed, the removable platen is positioned less than approximately 25 millimeters (mm) above an upper surface of the housing of the imaging device. In contrast, known platens that are fixed to the imaging devices are non-removable and are positioned at least 75 mm above the imaging devices to enable access to paper jams, consumables, etc. Thus, known imaging devices with fixed platens have significantly taller profiles than the example imaging devices disclosed herein.

In some examples disclosed herein, when the platen is moved to the open position, frictional hinges hold the platen in the open position to enable access to paper, paper jams and/or consumables within the imaging device. In examples disclosed herein including aligners, pegs, guides and/or ribs, an interaction between the structures of the platen and corresponding structures of the imaging device enable the platen to be removably coupled and/or aligned relative to the imaging device. In some examples, to couple the platen to the imaging device, pegs of a second portion (e.g., lower surface of the platen) are received by apertures defined in the housing of the imaging device (or vice versa). To facilitate securely coupling the platen to the imaging device, the pegs of some examples include magnets that correspond to magnets or ferromagnetic materials in or adjacent the mating apertures. Additionally or alternatively, in some examples, when the platen is properly aligned relative to the imaging device, ribs and/or other structures of the second portion interlock with and/or are received by corresponding structures of the imaging device (and/or vice versa).

In some examples disclosed herein, the first and second portions of the platen are separate pieces which are removably coupled together using, for example, magnets, fasteners, etc. In some such examples, the first portion is reversibly coupled to the second portion such that either of two opposing surfaces (e.g., a first surface, a second surface) of the first portion can face the image capture device. For example, the first portion of the platen can be coupled to the second portion of the platen such that the first surface of the first portion having a first color (e.g., white) faces the image capture device or the first portion of the platen can be coupled to the second portion of the platen such that the second surface of the first portion having a second color (e.g., green) faces the image capture device. The background color (e.g., white, green, etc.) of the first portion enables a background around a captured image of a three-dimensional object to be removed using, for example, an image editing program. Because two background colors are provided in such examples, a user may select which background color is best suited and/or most contrasts with the color of the three-dimensional object imaged. While the above example describes the background colors as being white and green, any other color(s) may be additionally or alternatively used.

FIG. 1 depicts an example imaging device 102, an example opaque platen 104 and an example image capture device (e.g., camera) 106. While the entire platen 104 is opaque in this example, in other examples, portions (e.g., a center) of the platen are opaque and other portions (e.g., sides) of the platen are transparent. FIG. 1 depicts the image capture device 106 in both a use position 107 and a non-use position 108. In the use position 107, the image capture device 106 is positioned at a distance above the platen 104. In the non-use position 108, the image capture device 106 is positioned adjacent to and/or received by a cavity 201 (FIG. 2) defined by the platen 104. In the non-use position 108, an interaction between the image capture device 106 and the cavity 201 (FIG. 2) substantially prevents condensation from forming on the imaging lens of the image capture device 106 when the imaging device 102 is in use and generating heat by reducing the heat and/or air contacting the image capture device 106.

In the example of FIG. 1, the platen 104 is removably coupled to the imaging device 102 and the capture device 106 is hingably and/or operatively coupled to the imaging device 102 via an arm 109. In the use position 107, the platen 104 is positioned between an upper surface 103 of a housing 105 of the imaging device 102 and the image capture device 106. In this example, to removably couple the platen 104 to the imaging device 102, the platen 104 includes pegs and/or elongated members 110 having ends and/or feet 202 (FIG. 2) that are matingly received in apertures 112 of the housing 105 of the imaging device 102. In some examples, second portions 114 of the pegs 110 are sized to position the platen 104 at a distance from the imaging device 102 when the ends 202 (FIG. 2) are received by apertures of the housing 105 of the imaging device 102 to enable a paper output path and/or gap 116 to be defined between the platen 104 and the imaging device 102. In some examples, the pegs are on the housing 105 and the apertures are on the platen 104. The paper output path 116 of some examples is less than approximately 25 mm tall (e.g., between the upper surface 103 of the housing 105 and a lower surface 301 (FIG. 1) of the platen 104). Other suitable distances (e.g., 20 mm, 22 mm, 27 mm, 31 mm, etc.) may alternatively be used instead. In some examples, a shoulder 203, defined on a side surface of a peg 110 between the end 202 of a peg 110 and the second portion 114 of the platen 104 rests on a surface 118 of the imaging device 102 when the platen 104 is coupled to the imaging device 102. One or more of the pegs may include side shoulders 203.

In operation, the platen 104 of the imaging device of the illustrated example is removably coupled to the imaging device 102 and an object to be scanned and/or copied is placed on a first surface and/or portion 118 of the platen 104. The image capture device 106 captures an image of the object by scanning and/or taking one or more pictures from above the object. The imaging device 102 may print an image of the document on a piece of paper that exits through the paper output path 116 and/or may save an electronic copy of the image.

Figure 2:
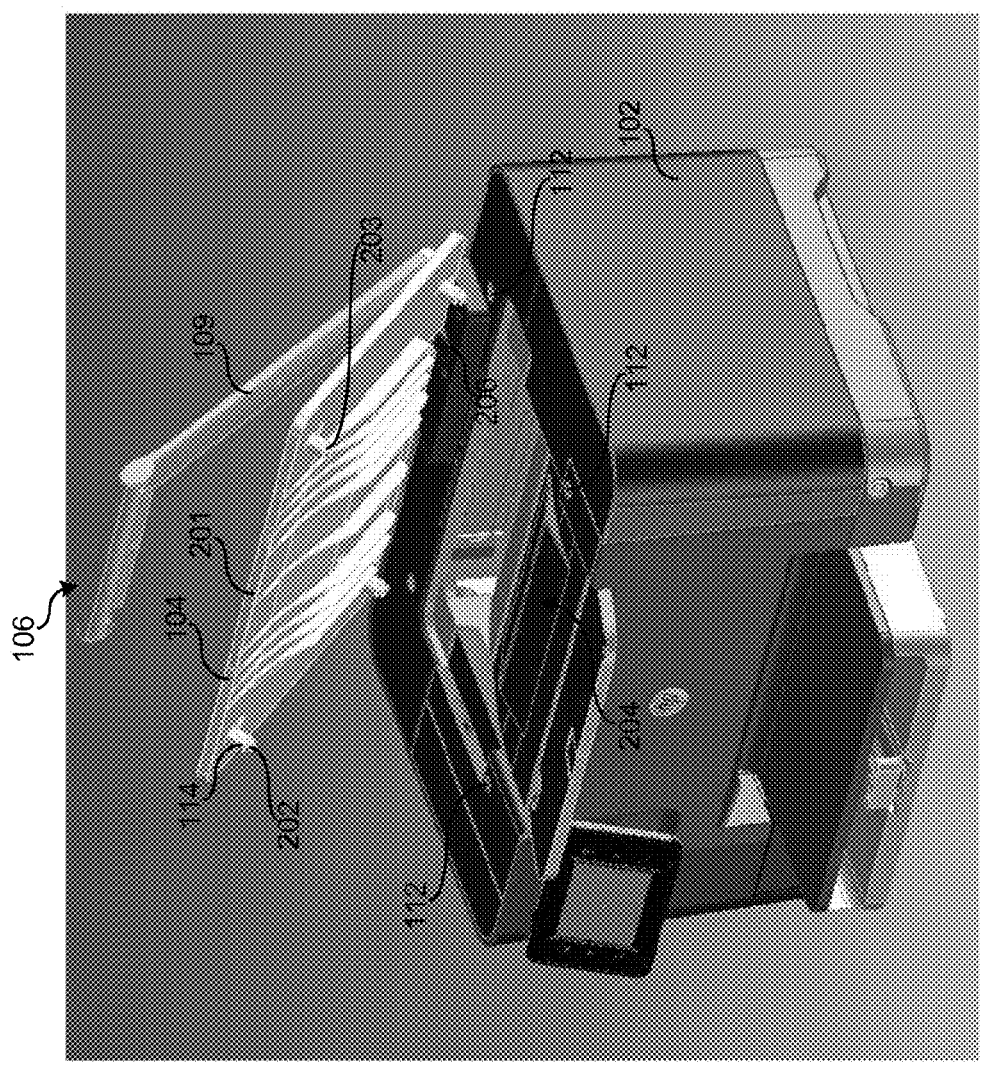
FIG. 2 depicts the example imaging device of FIG. 1 with the example platen being removed from the imaging device.

FIG. 2 depicts the platen 104 being removed from the imaging device 102.

Figure 3:
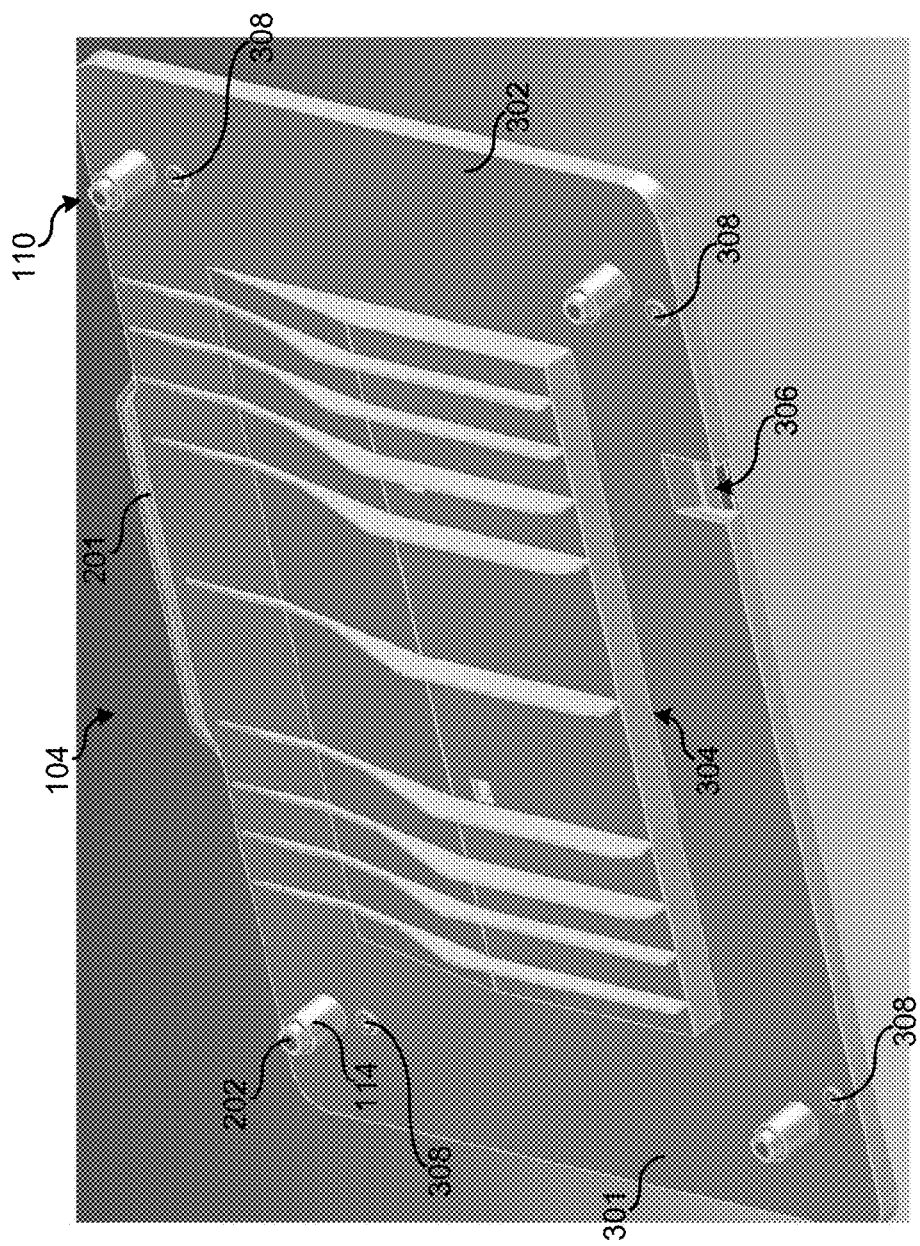
FIG. 3 is a bottom, perspective view of the example platen of FIG. 1.

FIG. 3 depicts a second surface 301 and/or portion 302 of the example platen 104 from which the pegs 110 extend. The second portion 302 includes contoured ribs 304 that, when the platen 104 is coupled to the imaging device 102, partially define the paper output path 116. In some such examples, the contour of the ribs 304 substantially corresponds to a contour 204 (FIG. 2) of the imaging device 102 to guide papers though the output path 116 to facilitate paper stacking. In this example, the second portion 302 defines a notch 306 that receives a portion 206 (FIG. 2) of the imaging device 102 and apertures 308 that receive fasteners to couple the first portion 118 to the second portion 302. The interaction between the notch 306 and the portion 206 at least partially aligns the platen 104 of the illustrated example relative to the imaging device 102.

FIG. 4 depicts another example opaque platen 400. While the entire platen 400 is opaque in this example, in other examples, portions of the platen are opaque and other portions of the platen are transparent. In this example, the platen 400 includes a reversible first portion 402 that is removably coupled to and/or received by a second portion 404 in a clam-shell arrangement. The first portion 402 of the illustrated example includes a first surface 406 having a first color and a second surface 408 having a second color. To couple the first and second portions 402 and 404, in this example, the second portion 404 includes side walls 410 defining an opening and/or cavity 411 that receives the first portion 402. The side walls 410 may define an opening 412 to enable a user to grip a grip portion 414 of the first portion 402 to remove, reverse and recouple the first portion 402 to the second portion 404 such that the first surface 406 faces the second portion 404 instead of the second surface 408 facing the second portion 404. Thus, a user can select which surface 406 or 408 (and/or surface color) is best for a particular application and/or object being copied or scanned.

FIG. 5 depicts the first portion 402 of the example platen 400 of FIG. 4. In some examples, the first and second surfaces 406 and 408 correspond to separate elements that are coupled together via magnets, fasteners, etc. In some examples, magnets may be placed within the first portion 402 that correspond to magnets and/or magnitizable material of the second portion 404 to enable coupling thereto.

Figure 7:
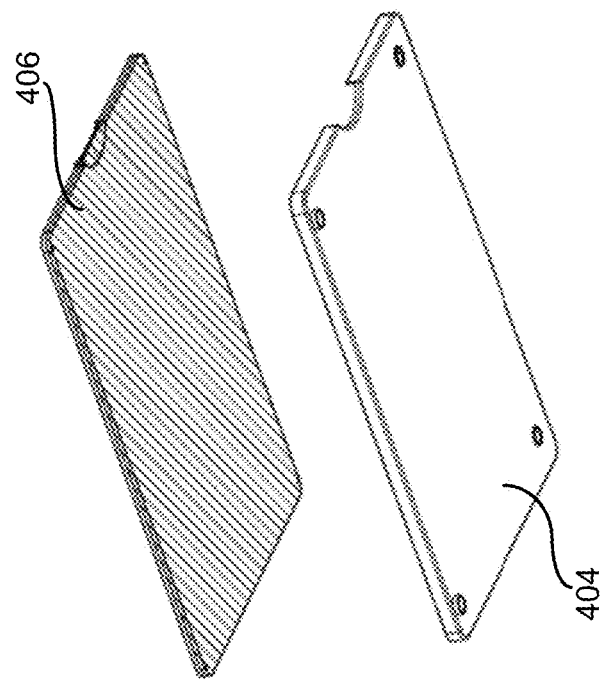
FIGS. 6 and 7 are exploded views of the example platen of FIG. 4.
Figure 6:
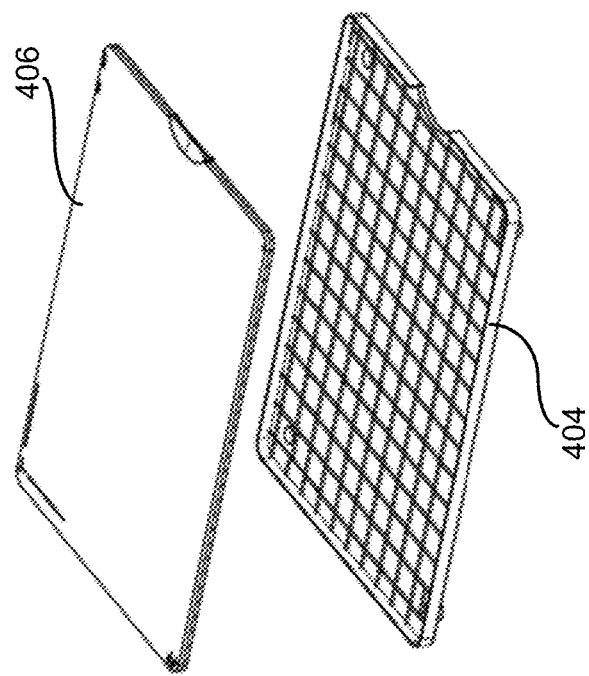

FIGS. 6 and 7 depict exploded views of the example platen 400.

Figure 8:
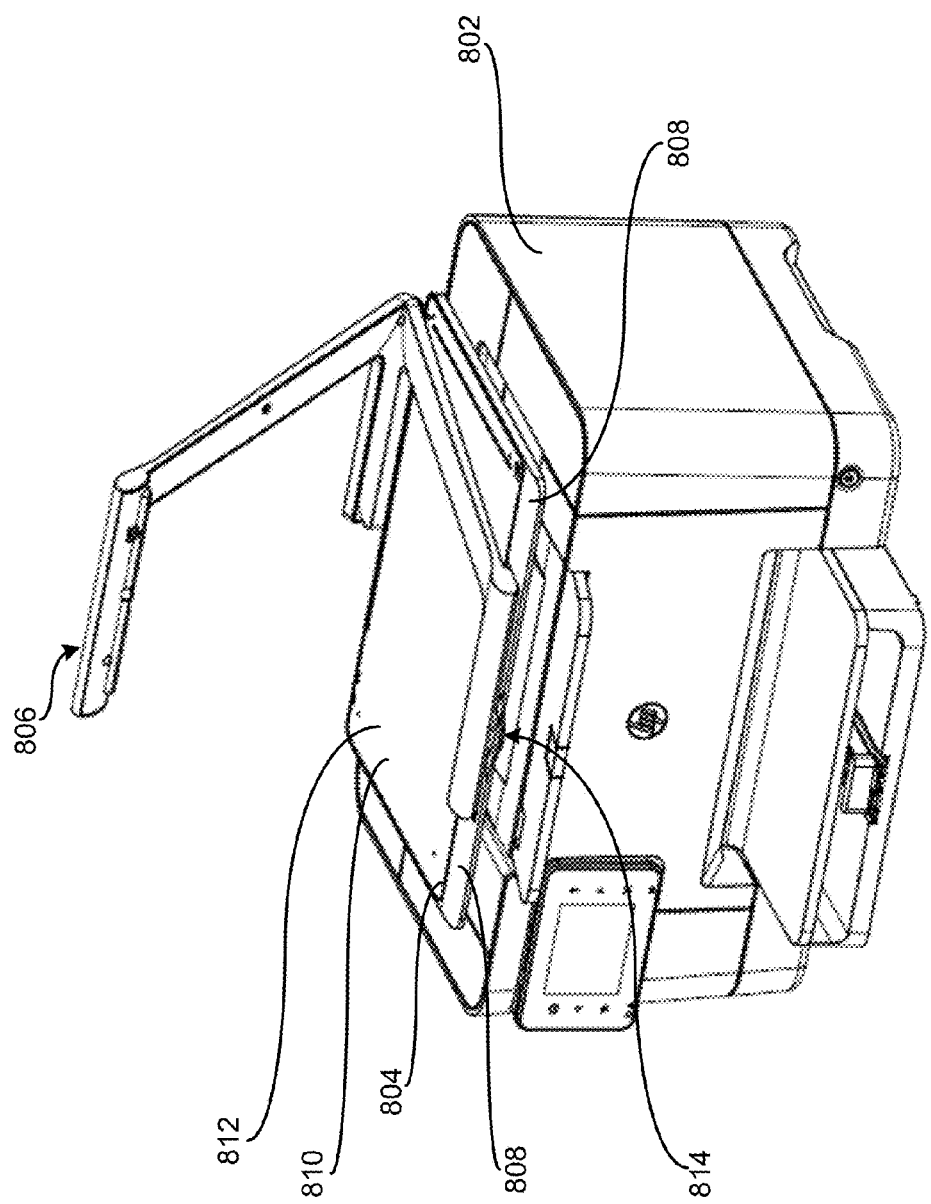
FIG. 8 depicts another example imaging device including an example platen constructed in accordance with the teachings of this disclosure.

FIG. 8 depicts another example imaging device 802 including an example opaque platen 804 and an example image capture device (e.g., camera) 806. While the entire platen 804 is opaque in this example, in other examples, portions (e.g., a center) of the platen are opaque and other portions of the platen (e.g., sides) are transparent. FIG. 8 depicts the image capture device 806 in a use-position and a non-use position. In the non-use position, the image capture device 106 is positioned adjacent to and/or received by a lip, groove, and/or receptacle 902 (FIG. 9) of the platen 804. This interaction between the image capture device 806 and the receptacle 902 substantially prevents condensation from forming on the image capture device 806 when the image capture device 806 is stored in this position.

Figure 9:
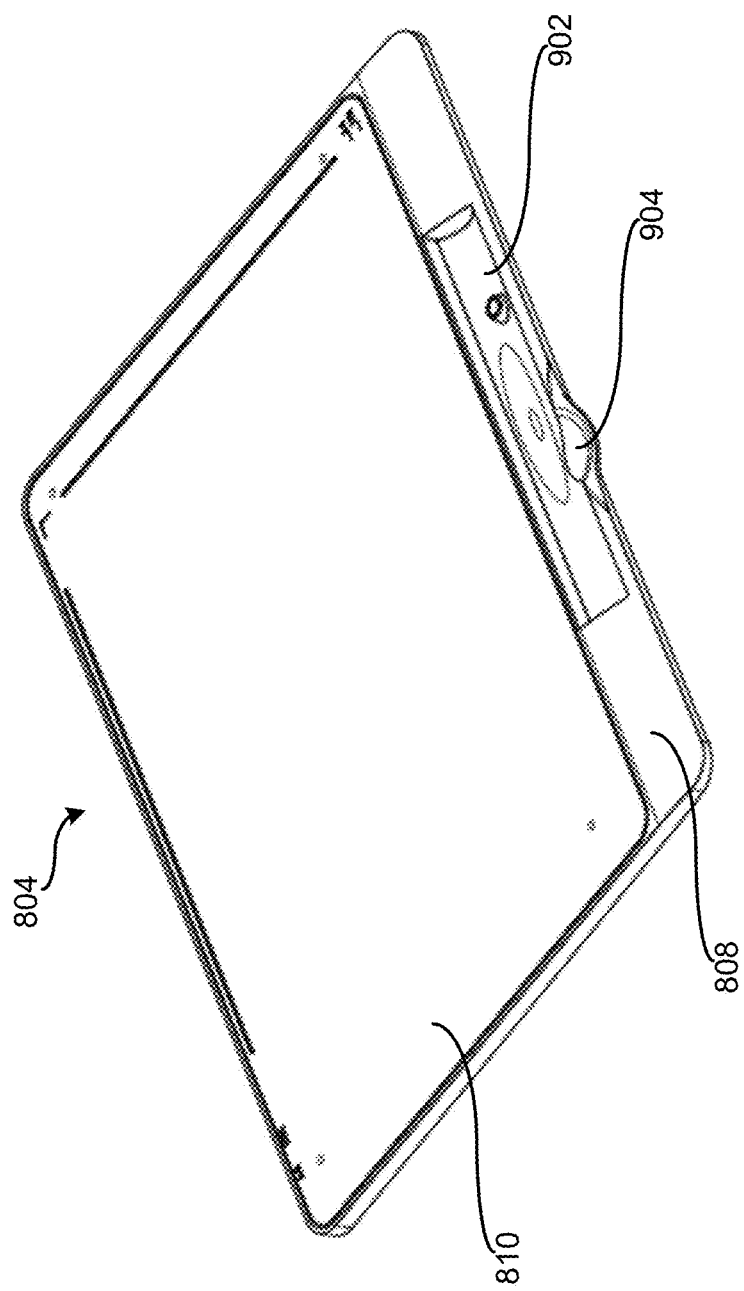
FIG. 9 is a top view of the example platen of FIG. 8.
Figure 10:
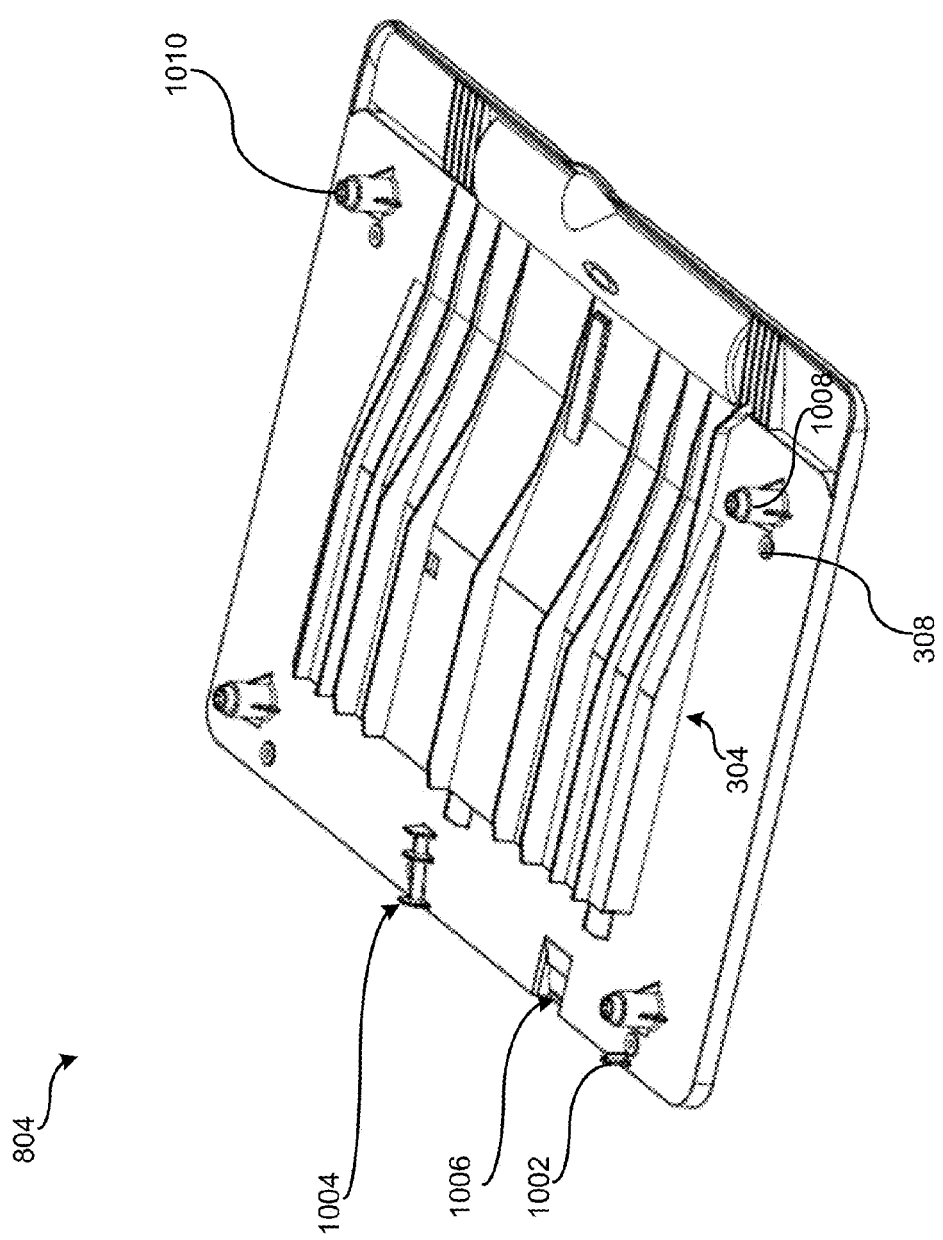
FIG. 10 is a bottom view of the example platen of FIGS. 8 and 9.

In contrast to the platen 104 of FIG. 1, in this example, the platen 804 includes a second portion 808 that extends from a first portion 810 to define the receptacle 902 (FIG. 9). In this example, the second portion 808 also defines an indentation 904 (FIG. 9) to enable the image capture device 806 to be gripped with a hand and easily moved from the non-use position. Additionally, referring to FIG. 10, in this example, the platen 804 includes a locator 1002, ribs 1004, a notch 1006 and pegs 1008 (e.g., locators) that correspond to structures of the imaging device 802. In this example, when the platen 804 is properly aligned relative to the imaging device 802, the ribs 1004 interlock with, surround and/or are received by corresponding structures of the imaging device 802. Additionally, the locator 1002 is received in an aperture and/or positioned adjacent structure of the imaging device 802. Further, the notch 1006 receives a portion of the imaging device 802 and ends 1010 of the pegs 1008 are received in apertures of the imaging device 802.

Figure 12:
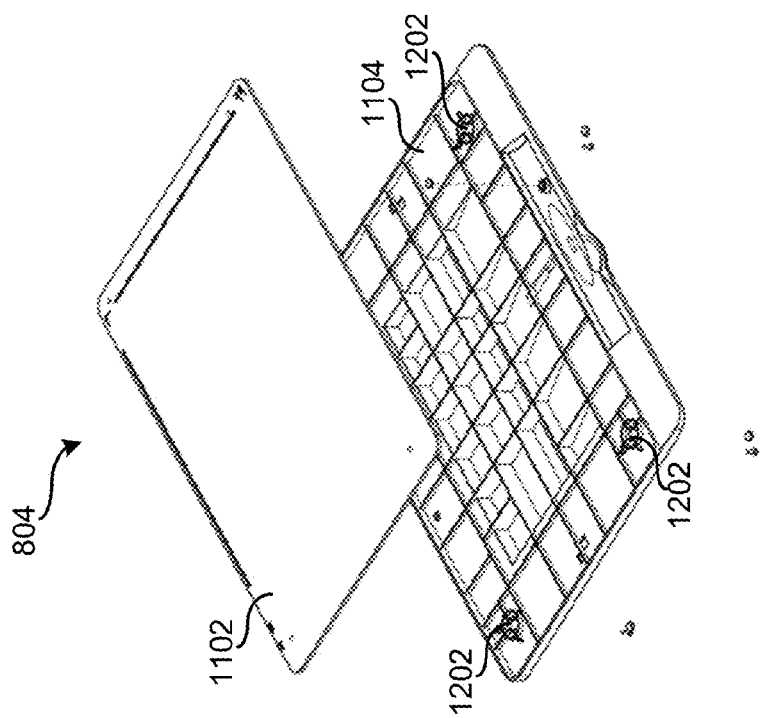
FIGS. 11 and 12 are exploded views of the example platen of FIGS. 8-10.
Figure 11:
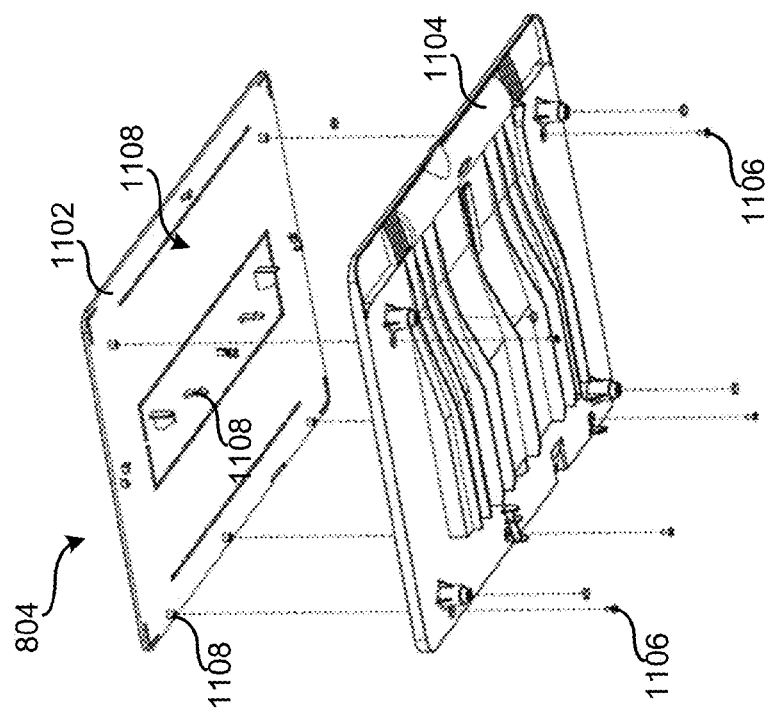

FIGS. 11 and 12 illustrate exploded views of the example platen 804. In the illustrated example, the platen 804 includes a first portion 1102 received by a second portion 1104 in a clam-shell arrangement and coupled thereto by fasteners 1106. In some such examples, the first portion 1102 includes guides 1108 (e.g., clips, extensions, pegs, etc.) to facilitate aligning and/or coupling the first portion 1102 to the second portion 1104. For example, some of the guides 1108 are received in apertures 1202 (FIG. 12) of the second portion 1104. The fasteners 1106 are engaged to the guides 908 to secure the first and second portions 1102 and 1104.

In operation, the platen 804 is removably coupled to the imaging device 802 and an object to be scanned, photographed, and/or copied is placed on a surface 812 of the first portion 810. The image capture device 806 captures an image of the object by scanning and/or taking one or more pictures of the object. The imaging device 802 may print an image of the object on a piece of paper that exits through a paper output path 814 and/or may store the image electronically and/or send the image to another device.

Figure 13:
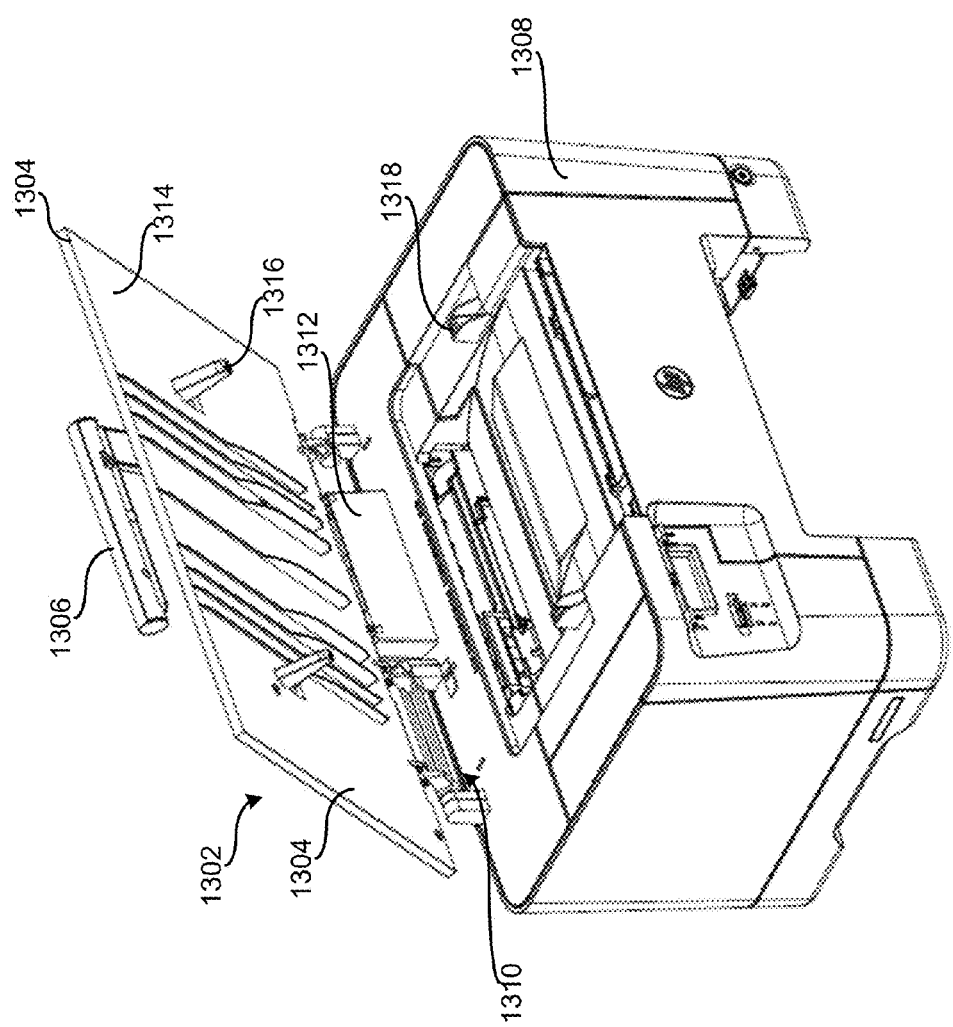
FIGS. 13-15 depict different views another example imaging device including an example platen constructed in accordance with the teachings of this disclosure.
Figure 14:
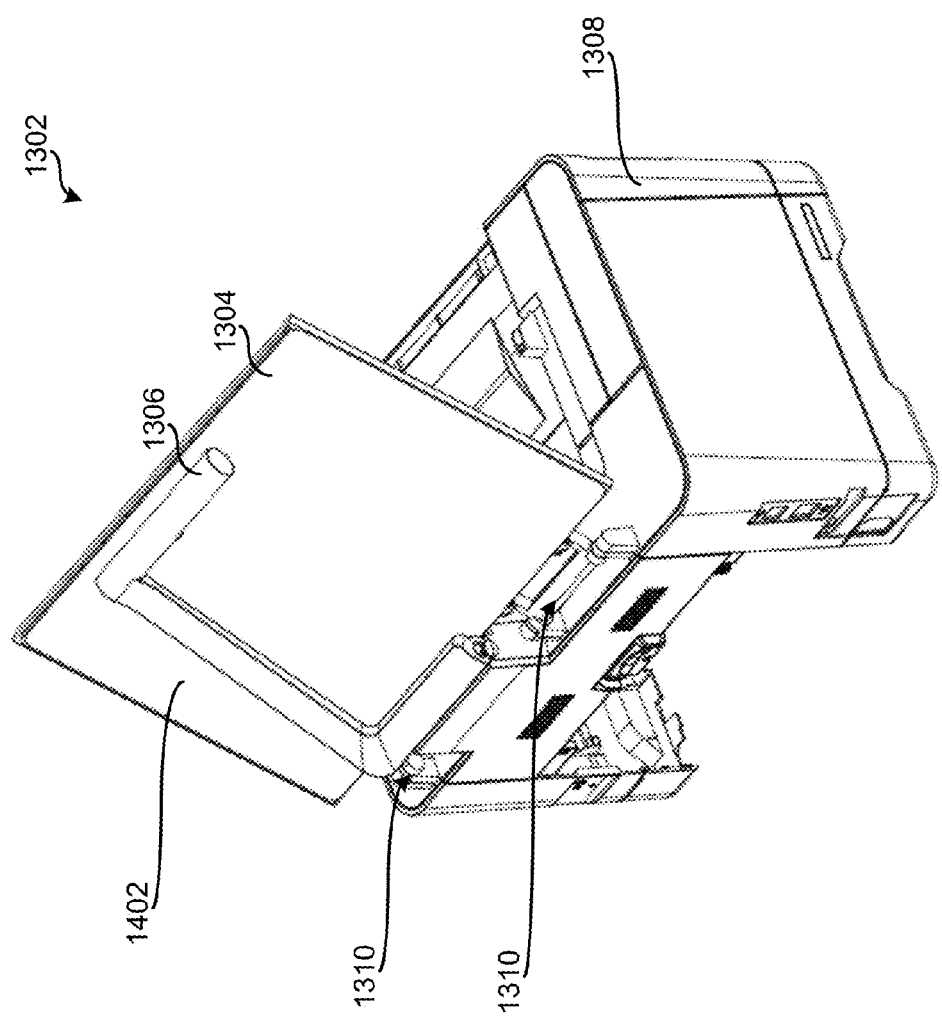
Figure 15:
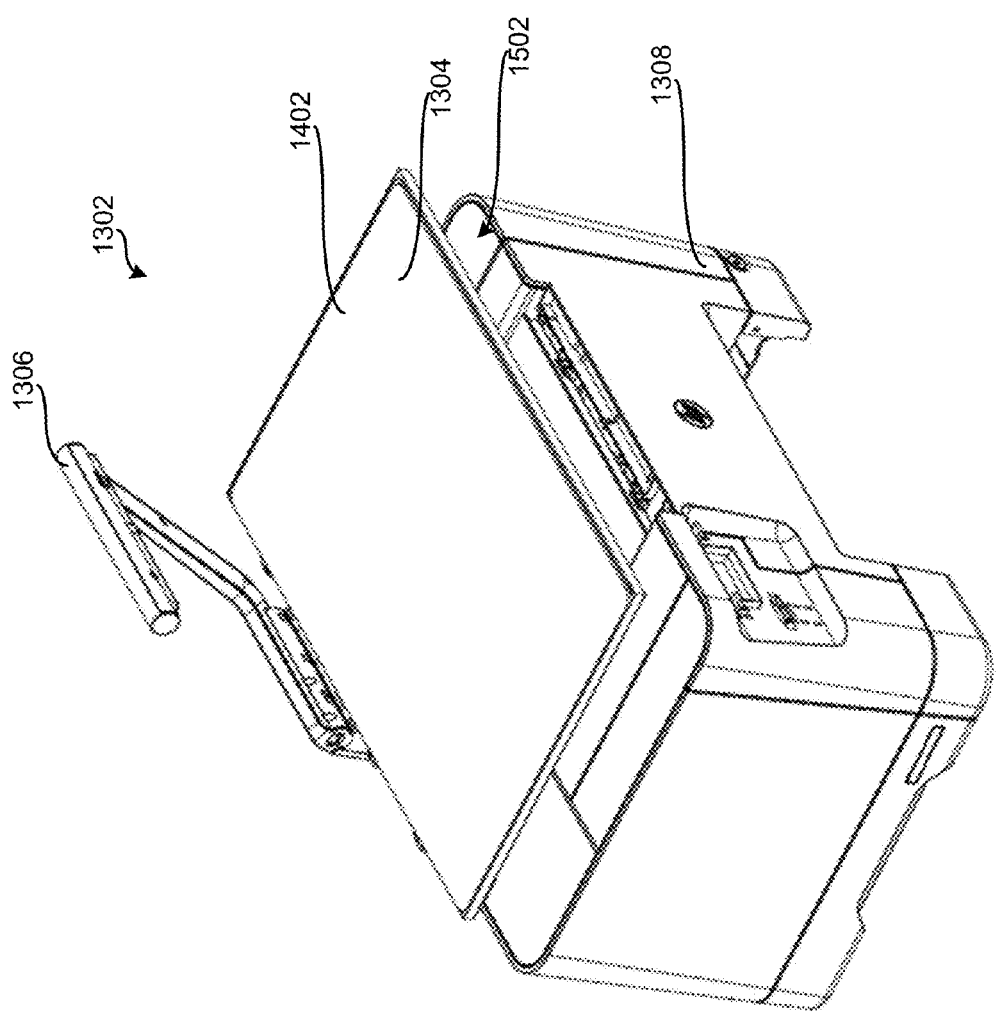

FIGS. 13-15 depict another example imaging device 1302 including an example opaque platen 1304 and an example image capture device (e.g., camera) 1306. The platen 1304 of the example imaging device 1302 is hingably coupled to a housing 1308 of the imaging device 1302. In the illustrated example, to enable the platen 1304 to be positioned relatively close to an extension 1312, hinges 1310 are positioned on either side of the extension 1312 of the housing 1308 to which the image capture device 1306 is coupled. While the illustrated example includes three pivot points at the housing 1308, any other number of pivot points may be used adjacent the housing 1308 and/or adjacent the platen 1304. In the illustrated example, a lower surface 1314 of the platen 1304 includes guides and/or pegs 1316 that are received by apertures 1318 defined by the housing 1306 (or vice versa) to position the platen 1304 relative to the housing 1308.

In operation, the platen 1304 is lowered relative to the housing 1308, the pegs 1316 are received by the apertures 1318 and an object to be scanned, photographed, and/or copied is placed on a surface 1402 of the platen 1304. The image capture device 1306 captures an image of the object by scanning and/or taking one or more pictures of the object. The imaging device 1302 may print an image of the object on a piece of paper that exits through a paper output path 1502 (FIG. 15) and/or may store the image electronically and/or send the image to another device.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a platen to be removably coupled to an upper surface of an imaging device, the platen including a first portion and a second portion opposite the first portion, an object whose image is to be captured is to be placed on the first portion, a paper output path being defined between the platen body and the upper surface of the imaging device,
wherein the first portion is to face a camera pivotably coupled to the imaging device via an articulating arm, the camera being disposed at an end of the articulating arm, the articulating arm being independently moveable relative to the platen between a non-use position and a use position, in the non-use position the end and the camera being spaced a first distance from the platen, in the use position the end and the camera being spaced a second distance from the platen, the first distance being less than the second distance to enable the image to be captured of the object.

2. The apparatus of claim 1, wherein the first portion is to face an image capture device, the image capture device to face the paper output path to enable the image of the object to be captured, the platen to be disposed between the paper output path and the image capture device, the image capture device pivotably coupled to the imaging device.

3. The apparatus of claim 2, wherein the first portion is removably coupled to the second portion to enable either a first surface of the first portion or a second surface of the first portion to face the image capture device, when the first portion is coupled to the second portion and the first surface faces the second portion, the second surface faces the image capture device, when the first portion is coupled to the second portion and the second surface faces the second portion, the first surface faces the image capture device.

4. The apparatus of claim 3, wherein the first and second portions are removably coupled with magnets.

5. The apparatus of claim 4, wherein the first surface includes a first color and the second surface includes a second color, the first and second colors associated with a background to be removed from around the image.

6. The apparatus of claim 4, wherein the first portion includes a varying thickness portion to enable the first portion to be reversed to place either the first surface or the second surface facing the image capture device.

7. The apparatus of claim 2, herein at least a portion of the platen is non-transparent to the image capture device from including the upper surface of the imaging device in the image, the upper surface facing the second portion of the platen.

8. The apparatus of claim 1, wherein the imaging device includes a printer and the object includes a three-dimensional object.

9. The apparatus of claim 1, further including a plurality of posts that extend from the second portion to matingly engage the imaging device.

10. The apparatus of claim 9, wherein at least one of the posts or the imaging device includes magnets to removably couple the platen to the imaging device.

11. The apparatus of claim 1, wherein the platen includes a rib to enable the platen to be aligned relative to the imaging device.

12. The apparatus of claim 1, wherein the second portion includes a plurality of ribs extending from the platen body toward the upper surface, the ribs at least partially define the paper output path of the imaging device.

13. The apparatus of claim 1, wherein the second portion receives the first portion in a clam-shell arrangement.

14. The apparatus of claim 1, wherein the platen is opaque.

15. The apparatus of claim 1, wherein the platen is to be removably coupled to the upper surface of the imaging device to enable access to at least one of a paper jam within the imaging device and a consumable within the imaging device.

16. The apparatus of claim 1, wherein the second portion includes a perimeter wall defining a cavity to removably receive the first portion.

17. The platen of claim 1 wherein the platen includes a guide that at least partially defines the paper output path of the imaging device.

18. The platen of claim 1, wherein at least a portion of he platen is transparent.

19. A platen for an imaging device, comprising:
a platen body to be removably coupled to an upper surface of the imaging device, the platen body including a first portion and a second portion opposite the first portion, an object whose image is to be captured is to be placed on the first portion, a paper output path being defined between the platen body and the upper surface of the imaging device, the first portion to face an image capture device, the image capture device pivotably coupled to the imaging device, the second portion defines a receptacle to receive at least a portion of the image capture device when the image capture device is in a non-use position, the image capture device being immediately adjacent the receptacle in the non-use position, the image capture device being spaced from the receptacle and the platen body in a use position.

20. The platen of claim 19, wherein the image capture device being immediately adjacent the receptacle in the non-use position is to prevent condensation from forming on the image capture device during a printing operation of imaging device.

21. An apparatus, comprising:
a housing;
an image capture device operably coupled to the housing; and
a platen removably coupled to the housing between the housing and the image capture device to facilitate capture of an image of an object on the platen, a paper output path being defined by the housing and the platen, wherein the platen includes a guide that at least partially defines the paper output path of an imaging device.

22. The apparatus of claim 21, wherein the platen includes a plurality of locators to align the platen relative to the imaging device.

23. The apparatus of claim 21, wherein the platen includes a plurality of pegs extending therefrom that are to be received in apertures of the housing to removably couple the platen to the housing.

24. The apparatus of claim 21, wherein the housing includes a plurality of pegs extending therefrom that are to be received in apertures of the platen to removably couple the platen to the housing.

25. The apparatus of claim 21, wherein the guide includes a plurality of ribs.

26. The apparatus of claim 21, further including an, arm coupled between the housing and the image capture device, the arm pivotably coupling the image capture device to the housing.

27. The apparatus of claim 26, wherein the arm is pivotably coupled to the image capture device at a pivot, the platen spaced from the pivot when the platen is removably coupled to the housing.

28. The platen of claim 21, wherein at least a portion of the platen is transparent to show a portion of the paper output path.

* * * * *

UNITED STATES PATENT AND TRADEMARK OFFICE
CERTIFICATE OF CORRECTION

| | |
|---|---|
| PATENT NO. | : 9,674,382 B2 |
| APPLICATION NO. | : 13/532318 |
| DATED | : June 6, 2017 |
| INVENTOR(S) | : David B. Larson et al. |

It is certified that error appears in the above-identified patent and that said Letters Patent is hereby corrected as shown below:

In Column 6, Line 14 approx., in Claim 2, delete "pivotabiy" and insert -- pivotably --, therefor.

In Column 6, Line 34 approx., in Claim 7, delete "herein" and insert -- wherein --, therefor.

In Column 7, Line 4, in Claim 18, delete "he" and insert -- the --, therefor.

In Column 8, Line 20, in Claim 26, delete "an," and insert -- an --, therefor.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*